Jan. 5, 1954   D. H. GRANGAARD   2,665,221
PROCESS FOR IMPREGNATING CELLULOSIC SHEET
Filed July 7, 1950
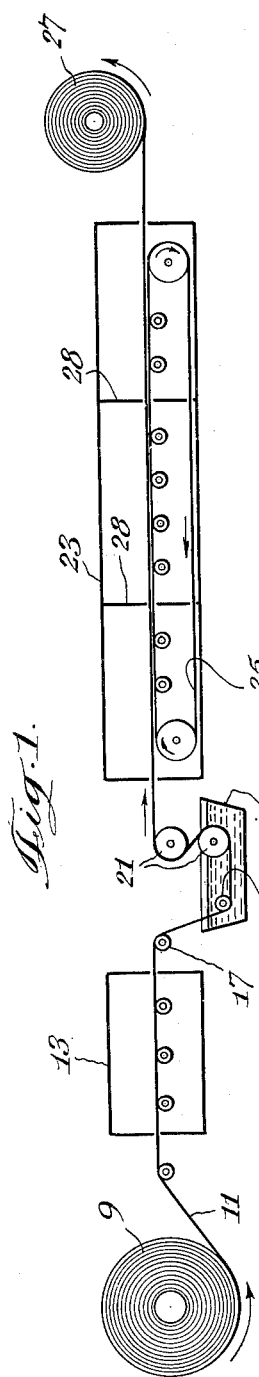
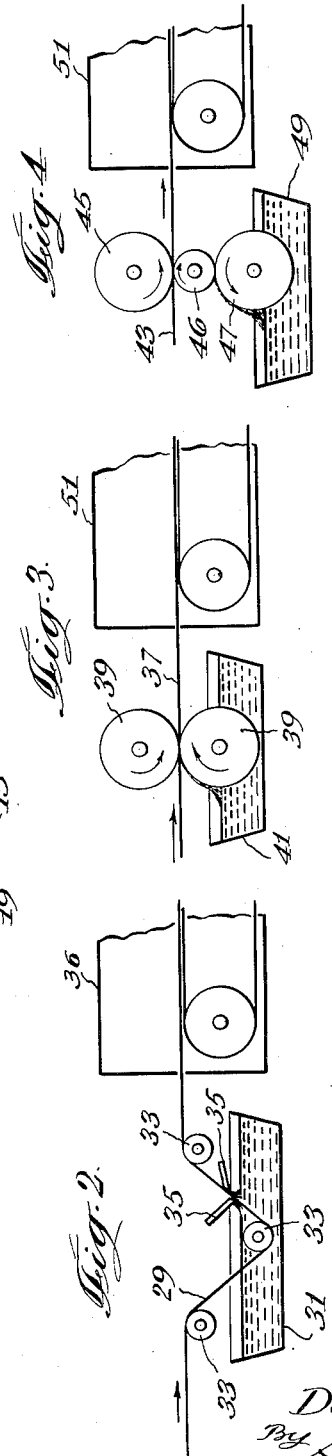
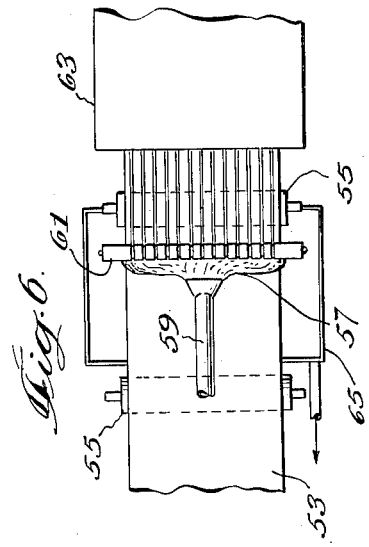
Inventor
Donald H. Grangaard
By Soans, Glaister & Anderson
Attorneys Patented Jan. 5, 1954

2,665,221

UNITED STATES PATENT OFFICE 2,665,221

PROCESS FOR IMPREGNATING CELLULOSIC SHEET

Donald H. Grangaard, Appleton, Wis., assignor to Paper Patents Company, Neenah, Wis., a corporation of Wisconsin Application July 7, 1950, Serial No. 172,496

4 Claims. (Cl. 117—60)

This invention relates to resin-impregnated cellulosic products, and particularly to cellulosic sheet products which are impregnated with water-soluble, synthetic resins.

In the manufacture of various types of resin-impregnated, cellulosic sheet products, and especially sheet products impregnated with phenol-aldehyde resins, it is well known that the products which are manufactured by the use of resins which have been dissolved in organic solvents possess, for a given resin content, much better physical properties than do comparable products which are manufactured by the use of water soluble resins. This is particularly true in respect of the ability of the sheet to withstand bending stresses, i. e. the strain at failure characteristics of the material, and the impact resistance of the sheet, although other characteristics of the sheet, such as moisture resistance, flow ability and scuff resistance, may also be substantially improved by the use of resins dissolved in organic solvents.

As a result, it has become generally accepted in the art that resin-impregnated, cellulosic sheet products which have been impregnated by the use of aqueous solutions of water-soluble, phenol-aldehyde resins are unsuitable, or at least very inferior, for many applications, for example, as core stock material, as constituent sheets in high resin content laminates, as overlays, etc. There are many advantages in the use of aqueous solutions of water-soluble resins for impregnating purposes, important among which are materially lower cost, considerably greater ease of handling, and the complete elimination of the fire and explosion hazard which always accompanies the use of organic solvents. Hence, there has long been a need for, and many efforts have been made to produce, cellulosic sheet products impregnated with water-soluble, phenolic resins, having physical and other characteristics comparable to sheets produced by the use of such resins dissolved in organic solvents. The results of this work have, however, been unsuccessful, at least on a commercial basis.

The present invention is directed to the solution of this problem, and as will hereinafter appear, the invention is predicated upon the discovery of certain, novel impregnating procedures, which make possible the use of water-soluble, phenolic resins for much the same purposes for which organic-soluble resins are now used.

More specifically, the invention includes the discovery that many of the product weaknesses previously encountered in the use of water-soluble, impregnating resins of the phenol-aldehyde type can be avoided, if the impregnation of the cellulosic sheet material is carried out under such conditions that the total moisture in the sheets and in the impregnating resin available to wet the cellulosic fiber, at the time of the impregnating operation, does not exceed certain limiting values. This will be more fully set forth in the following description of certain preferred methods of practicing the invention, taken in conjunction with the accompanying drawings, which illustrate apparatus adapted for use in impregnating cellulosic sheet material in accordance with the invention.

In the drawings:

Figure 1 is a schematic view, illustrating one type of apparatus and procedure which can be used in the manufacture of resin-impregnated, cellulosic sheets products in accordance with the invention;

Figures 2, 3 and 4 are schematic views, illustrating other apparatus and procedures for effecting the impregnation of cellulosic sheet materials with a water-soluble resin in accordance with the invention;

Figure 5 is a schematic illustration, illustrating still another apparatus and procedure for impregnating a cellulosic sheet product with a water-soluble resin in accordance with the invention; and Figure 6 is a schematic, plan view of the apparatus illustrated in Figure 5.

In the manufacture of resin-impregnated, cellulosic sheet products in accordance with the present invention, it is possible to use known types of water-soluble resins and, with some modification, existing impregnation apparatus and procedures, provided, of course, that the critical conditions which result in the improved product are maintained. Thus, the sheet which is to be impregnated can be passed through a dip pan which contains the impregnating resin, following which the sheet is directed between a pair of squeeze rolls or other means for determining the resin content, and after this operation, the sheet may be passed through a drying or curing oven, as is conventional in the art.

Apparatus of this type is illustrated in Figure 1. in which figure a roll of the paper which is to be impregnated is shown at 9. A sheet 11 from this roll is drawn through a heated oven or other means, indicated at 13, which is operable to reduce the moisture content of the sheet, following which the sheet is guided into and through a dip pan 15, containing the impregnating resin, by means of suitable guide rolls 17 and 19. As the sheet 11 leaves the dip pan 15, it passes between a pair of cooperating squeeze rolls 21, which are adjusted to control the resin content of the sheet. Upon leaving the squeeze rolls 21, the sheet 11 passes through a drying oven, indicated diagrammatically at 23, and in accordance with conventional practice, the sheet is desirably supported on a belt conveyor or other support 25 during its passage through the drying oven. The dried, resin-impregnated sheet is then stored on a suitable take-up roll, as illustrated at 27.

As previously indicated, the present invention contemplates that the impregnation of the cellulosic sheet shall be carried out under very carefully controlled conditions of moisture content in both the resin and in the sheet itself, and it is by virtue of this control of the moisture content at that time, that the improved results of the invention are attained. Particularly, it appears that the impregnation or other resin-applying operation should be carried out under such conditions that the total amount of moisture available to wet the fibers of the sheet at the beginning of the resin drying operation does not exceed about 8–10% of the total weight of the wet, impregnated sheet before drying. This will usually require that the impregnation operation be carried out by the use of high solids content resins which are in a substantially unextended state, and the discovery that satisfactory impregnation of cellulosic sheets can be effected by the use of water soluble-phenolic resins in this state is another important feature of the invention. Lower total available moisture contents give improved characteristics, although the improvement in the physical characteristics resulting from a decrease in the total moisture available to wet the fiber below from about 4 to 6%, is at a decreasing rate.

In arriving at the above-stated range, consideration has been given to the fact that it is very difficult to determine, by known chemical or mechanical separation procedures, exactly what percentage of the volatile portion of an unreacted, high solids content, phenolic resin constitutes moisture available to wet the fibers of a sheet that might be impregnated with that resin. This results, in part, from the fact that most of the procedures available for measuring the volatile content of resins do not differentiate between volatile as water and volatile as phenols et cetera, nor do they differentiate between moisture which is available and moisture which is not available to wet the fibers of a sheet being impregnated with that resin. Generally, however, it appears that approximately one-half the volatile material contained in an unextended, high solids content, phenolic resin (i. e., a phenolic resin having a solids content in the range of about 70% by weight) constitutes moisture, the greater part of which is available to wet the fibers of a sheet which is impregnated with that resin. Hence, in determining the amount of moisture which is present in the wet, impregnated sheet before drying, it is assumed that approximately one-half of the volatile content of the resin constitutes moisture available to wet the fiber, and the total amount of moisture available to wet the fiber is considered to be the sum of the moisture content in the sheet at the time it enters the resin applying mechanism, plus one-half the volatile content of the liquid resin added to the sheet in that mechanism.

The improvement in the physical characteristics of sheets which are impregnated with water-soluble resins of the phenol-aldehyde type, under such conditions that the total moisture available to wet the fibers is maintained within the values above stated, is very startling. In general, the physical characteristics of these sheets, particularly in respect of the strain at failure and impact resistance, are comparable to the results obtained when the impregnation is effected by the use of alcohol and other organic solvent solutions of phenol resins. For example, in a typical commercial product impregnated by the use of a water-soluble, phenol-formaldehyde resin, the strain at failure of the sheet for a given resin content was increased 75% when the impregnation was carried out in accordance with the invention, and the improvement in the impact strength of the sheet amounted to 90%.

The invention is applicable to sheets made from a wide range of furnishes and to sheets having a wide range of basis weights, although the improvement resulting from the practice of the invention does vary, to some extent, with the furnish used in the base sheet. Substantial improvement is noted with sheets made from practically all types of furnishes, but the actual percentage gain is greatest with sheets made from kraft and other chemical pulp furnishes. Sheets made from 100% kraft furnish show the maximum improvement. However, an almost equal improvement is noted in sheets made from an all-sulphite or all-soda furnish, and very important improvement is noted in sheets made from mixtures of kraft and sulphite, and mixtures of kraft and soda. Lesser improvement is noted in mixtures of groundwood with one or more chemical pulps.

The impregnating procedure of the invention can be used in conjunction with sheets of varying basis weight, depending primarily upon the type of impregnating equipment which is used during the impregnating operation. To illustrate, sheets made from a furnish which consists of 100% sulphite pulp, and having a basis weight within the range of from 50 to 70 pounds per standard ream of 480 sheets 24x36 inches (on a bone dry basis) have been successfully impregnated with amounts of resin up to 50% of the bone dry weight of the impregnated sheet by the use of equipment of the general type shown in Figure 1. Similar amounts of resin can be introduced into sheets made from other type furnishes, including sheets made from 100% kraft or soda pulp furnishes, and sheets made from mixtures of one or more chemical pulps alone, or with groundwood. By the use of other types of coating or impregnating apparatus, resins in amounts sufficient to produce resin contents in the finished sheet within the range of from 15 to 60%, based on the dry weight of the impregnated sheet, can be introduced into sheets having an unimpregnated basis weight of as much as 120 lbs. for 480 sheets 24x36 inches.

In Figures 2 to 6, there are illustrated certain other types of impregnating apparatus which can be used in the practice of the invention. In the apparatus shown in Figure 2, which, like the apparatus of Figure 1, is a dip roll mechanism, the sheet 29 to be impregnated is guided into and through a pan 31 containing the resin in liquid form, by means of suitable guide rolls 33, and the amount of resin introduced into the sheet is determined by means of a pair of scraper bars 35, one of which is disposed on either side of the sheet, as illustrated. After impregnation, the sheet is conducted into and through a drying oven 36 which may be similar to the oven 23.

In the use of water-soluble, phenolic resins, wherein amounts of resin up to 35 to 50% by weight are being introduced into sheets having a basis weight of the order of 60 to 120 lbs. per standard ream, the drying oven used for drying the wet, resin-impregnated sheet may have a length of the order of 60 feet, and may be operated at temperatures within the range of from about 200 to 250° F., the speed of the paper through the oven being from about 20 to 25 feet per minute. In some instances, it may be found desirable to operate the oven with a plurality of temperature zones, and this may be conveniently accomplished in an oven such as that illustrated at 23 by the use of internal divisions within the oven structure, as shown at 28, each section of the oven being separately controlled as to temperature. When other amounts of resin are to be added to the sheet, or when sheets of materially different basis weights are used, the length or operating temperature of the oven or both may be changed, as required.

While quite satisfactory impregnation can be effected by dip processes, as above described, there appears to be definite advantage in effecting the impregnation of the sheet by a coating operation, and mechanisms for this purpose are illustrated in Figures 3 and 4. In Figure 3, the sheet to be coated, which is illustrated at 37, is passed between a pair of press rolls 39, one of which dips into a pan 41 containing the resin. In the Figure 4 structure, the sheet 43 is coated by use of a series of three rolls 45, 46 and 47, the lower of which dips into a resin pan 49. In the use of either of these mechanisms, the wet, resin-impregnated sheet is conducted through a drying oven, as illustrated at 51, wherein the resin and the sheet are dried.

The resin may also be introduced into the sheet by means of a surface coating mechanism, such as is illustrated in Figures 5 and 6. In this apparatus, the sheet, shown at 53, is supported in a horizontal plane by means of suitable support rolls 55, and a pool of resin, indicated generally at 57, is maintained on the upper surface of the sheet by means which include a source of supply of resin, such as the pipe 59, and a dam or metering bar 61. The lower surface of the metering bar 61 is conveniently notched or grooved, and is adapted to bear lightly against the upper surface of the paper so as to distribute the resin thereon in a ribbed pattern. The sheet 53 passes directly into a suitable drying or curing oven 63 after passing under the metering bar 61. Surplus resin is caught in a pan 65 and may be recirculated. This type of coating mechanism is of particular utility when using resins which are of high viscosity as well as high solids content.

In the operation of all of the various types of impregnation or coater impregnation procedures illustrated in the drawings and described in the foregoing, it will be understood that the total moisture which is available in the base sheet and the impregnating resin to effect wetting of the cellulosic fiber in the base sheet, at the time the wet, resin-impregnated sheet leaves the impregnating mechanism and enters the drying oven, is maintained at a value which is less than from about 8 to 10% of the total weight of the wet, resin-impregnated sheet, and is preferably not more than from 4 to 6% of the weight of that sheet. If drying of the base sheet prior to impregnation is required, this is conveniently accomplished by passing the base sheet through a sheet drying mechanism, as previously described. The best results are obtained when the amount of moisture contained in the base sheet is reduced to as near the zero value as is possible, while using as little moisture as is possible in the impregnating resin. Also, as above noted, this will generally involve using high solids concentration resins in a substantially unextended state. Operating conditions do not always permit the convenient reduction of the moisture content of the sheet to bone-dry conditions, and as previously indicated, so long as the total available moisture is within the critical range, satisfactory results will be obtained.

In the practice of the invention, it has been noted that one of the effects of maintaining the total moisture available to wet the sheet fiber at the conclusion of the resin-impregnating operation, within the 8–10% range above stated, appears to be a substantial elimination of any expansion of the base sheet in the cross-machine direction. It is believed that this elimination of expansion in the sheet in the cross-machine direction contributes, at least in part, to the substantial improvement in the physical properties of the impregnated sheet. This view is strengthened by the observed fact that in instances where there is an appreciable expansion of the sheet in the cross-machine direction, due to excess moisture during the impregnating operation, there is an accompanying loss of physical properties. Thus, this elimination of expansion in the cross-machine direction constitutes another basis of determining the maximum amount of moisture that is permitted during the impregnation operation. It appears that the maximum, permissible expansion in the cross-machine direction should be less than .25%.

The limiting of the total available moisture in the impregnating resin and in the base sheet has a further, important advantage in that it effects substantial reduction in the drying load which is imposed upon the oven or other drying mechanism used in carrying out the impregnating operation. To illustrate, in the ordinary impregnation operation, as practiced prior to the present invention, water-soluble resins were generally used in aqueous solutions with a solids content of the order of from about 25 to 40%, and the moisture content of the base sheet often reached as large a value as from 10 to 12%. This meant that during the drying operation, it was necessary to remove in a sheet intended to contain about 30% resin by weight, some 53 parts by weight of water and other volatiles from each unit length of sheet. When the same amount of resin is introduced into a similar base sheet by the practice of the invention, and the moisture content of the base sheet is limited to say 5%, the amount of water and other volatiles which must be evaporated out in the drying oven, for the same length of sheet, decreases to 6.5 parts by weight. The invention thus makes possible material speeding-up of the impregnating operation, without increase in the oven or drying capacity.

Various types of water-soluble, phenolic resins can be used in the practice of the invention. Particular benefit, however, appears to result in connection with the use of water-soluble resins of the phenol-aldehyde type. These include resins derived from mono and polyhydric phenols and their derivatives (cresols, cresylic acids and derivatives and resorcinols) reacted with aldehydes and aldehyde yielding compounds, for example, formaldehyde (including formalin, paraformaldehyde, and hexamethylenetetramine) furfural, etc.

Generally, it is desirable that the impregnating resin shall be a relatively low viscosity, high solids content resin. Resins having a viscosity within the range of from about 100 to 250 centipoises at a temperature of 75° F., and solid contents within the range of from 68 to 72% by weight appear to give the best over-all results. These resins usually have a specific gravity within the range of from 1.19 to 1.21, dilutability within the range of from 50 to 500%, and are normally supplied and used at a pH range of from 7.5 to 8.5. As previously indicated, the resins are used substantially unextended.

Various amounts of resin can be added to base sheets in accordance with the invention. For example, when the sheets are to be used for high-pressure molded laminates, involving pressures in the molding press in excess of about 1000 lbs. per square inch, the resin content may conveniently be within the range of from about 22 to 26% by weight, based on the total weight of the resin-containing sheet in a bone-dry condition. Resin contents in sheets intended for low-pressure molding, i. e. molding involving pressures up to about 300 to 500 lbs. per square inch, will usually be within the range of from about 26–30% by weight. In sheets intended for use at very low molding pressures, for example, the pressures encountered in the manufacture of plywood, about 175 to 275 lbs. per square inch, resin contents up to from 40 to 45% by weight will frequently be desired. In the attainment of these various resin contents, it is generally convenient to accomplish the desired variation by controlling the amount of resin which is permitted to remain in, or on, the sheet as it passes into the drying oven. In the manufacture of sheets of varying resin contents, it will be evident that in order to maintain the total moisture available to wet the fiber within the stated range, it will sometimes be necessary to use either a drier base sheet, or to use resins containing somewhat lower available moisture in the manufacture of the higher resin content products.

Mixtures of resins may also be used, and the impregnation may be carried on in more than one step in accordance with existing practices in the resin impregnating art. The sheet may include a wet strength resin for the purpose of increasing its handleability, or for other purposes. Resin catalysts and accelerators may be employed, as desired.

As an illustration of the important benefits resulting from the practice of the process of the present invention, a 60 lb. (bone dry) basis weight sheet made from a furnish consisting of 100% unbleached kraft was impregnated by the use of apparatus of the type illustrated in Figure 1, with a water-soluble, phenol-formaldehyde resin containing approximately 70% solids and approximately 15% by weight of water in a form available to wet the base sheet. This resin was used without being extended, and as used, it had a viscosity of 150 centipoises at 75° F., (which was the temperature by which the impregnation was carried on), and a pH of 7.6. The resin, while water-soluble, was in a moderately advanced state of cure, approaching that stage where the resin is no longer soluble in water, but is still soluble in organic solvents such as alcohol.

An amount of resin sufficient to provide a resin content in the final sheet equal to approximately 30% of the total weight of the resin-containing sheet was applied during the impregnating operation. The sheet itself contained 5% of moisture at the time of the impregnating operation, and hence, as the wet, resin-bearing sheet passed into the drying oven, it contained approximately 8.7% moisture (based on the total weight of the wet, impregnated sheet before drying) in a form available to wet the cellulose fiber. When dried, the sheet had a total volatile content of 8%, and the resin was cured to the "B" stage. Prior to the impregnating operation, the sheet had a width of 30.7 inches, and there was no measurable increase in the cross-machine width during the impregnating operation.

This sheet was found to have physical characteristics, and especially strain at failure and impact resistance, equal to, or better than, a sheet of the same basis weight made from a similar furnish, which was impregnated with an alcohol solution of an alcohol-soluble type, phenol-formaldehyde resin in amounts sufficient to produce a similar resin content in the finished sheet. A similar weight sheet, which was impregnated under such conditions that the moisture available to wet the sheet fibers, during the impregnating operation, produced an expansion of the sheet during the impregnating operation from 30.7 inches to 31.4 inches, exhibited pronounced loss of physical properties.

As a second example, a base sheet having a basis weight of 50 lbs. per standard ream of 480 sheets 24 x 36 inches, on a bone dry basis, and made from a furnish which consisted of 50% unbleached sulfite and 50% unbleached kraft, was impregnated in accordance with the process of the present invention, with a water-soluble, phenol-formaldehyde resin having a viscosity at the impregnating temperature (75° F.) of 140 centipoises, a solids content of 70%, and a moisture content in a form available to wet the fiber of the sheet equal to about 15%. The resin was used unextended, and the impregnation was carried out with the resin at a pH of 7.5; the base sheet at the time of the impregnation contained 4.0% moisture. The amount of resin applied to the base sheet in this instance was sufficient to produce a finished sheet containing approximately 26% of resin, based on the dry weight of the resin-impregnated sheet. During the impregnating operation and at the time the resin-containing sheet entered the drying oven, the amount of moisture available to wet the fibers of the base sheet amounted to 7.5% (based on the total weight of the wet, impregnated sheet before drying). Here again, as in the above example, it was found that the resultant product had physical characteristics, and particularly strain at failure and impact resistance, equal or superior to similar sheet products impregnated with alcohol solutions of alcohol-soluble type, phenol-formaldehyde resins, in accordance with existing practices.

The impregnating procedures disclosed in the foregoing make possible the manufacture of resin impregnated sheet products by the use of water-soluble, phenolic resins with resultant physical characteristics equal to, or superior to, similar sheet materials impregnated by the use of alcohol-resin solutions with equal amounts of alcohol-soluble type resins. The invention thus greatly extends the field of usefulness of water-soluble, phenolic resins by making possible the manufacture of resin-impregnated sheet materials by the use of such water-soluble resins, which are capable of being used interchangeably with sheet materials which heretofore had to be made by the use of resins dissolved in alcohol or other organic solvents. This results in very substantial cost reduction and avoids the fire hazards and other disadvantages accompanying the use of alcohol-soluble type resins and organic solvents.

The invention has another important advantage in that its use as a general method of impregnating cellulosic sheet products with water-soluble, phenolic resins, makes possible material reduction in the resin content of such products, without loss of physical properties. In other words, in the manufacture of any sheet product by the use of water-soluble phenolic resins, the carrying out of the impregnation in accordance with the methods herein disclosed, makes possible very substantial reduction in the amount of resin which was heretofore required in those products, without change of physical properties. Generally, this reduction in resin content may be of the order of from 10 to 30%, without change in the physical characteristics of the product.

The sheet of the present invention is particularly adapted for use as core stock material in the manufacture of decorative laminates. Also, it has especial advantage when used as a surfacing material for plywood. In this latter application, the sheet exhibits particularly good resistance to checking, and in addition, it permits the use of sheets of considerably lower resin contents than has heretofore been considered possible for water-soluble, phenolic resin-impregnated sheets.

Various of the features of the invention believed to be new are set forth in the accompanying claims.

I claim:

1. In the manufacture of resin-impregnated, cellulosic sheet products by the use of water soluble phenolic resins, the improvement which consists in drying the sheet to be impregnated, and then impregnating the dried sheet by applying thereto a concentrated, water soluble phenol-aldehyde resin solution containing at least about 68 to 72 per cent phenol-aldehyde resin solids, the remainder being substantially volatilizable and substantially one half of said remainder constituting moisture, the moisture content of the dried sheet and the amount of resin solution applied to the sheet being so limited that the quantity $m$ in the following formula, which quantity is representative of the total moisture available to wet the cellulosic fibers of the sheet at the time of impregnation, does not exceed 8–10%:

$$m = \frac{\left(m_s + \frac{r_v}{2}\right)}{s+r} \cdot 100\%$$

where $s$ equals the total weight of a unit area of the dried, unimpregnated base sheet; $m_s$ equals the total weight of the moisture in said unit area of said dried sheet; $r$ is the total weight of the resin impregnating solution applied to said unit area of the dried sheet; and $r_v$ equals the total weight of the volatile content of the resin impregnating solution applied to said unit area of the sheet.

2. The method of manufacturing an improved, resin-impregnated, cellulosic sheet product from a base sheet containing at least a large percentage of chemical pulp, which consists in drying the sheet to be impregnated, and then impregnating the dried sheet by applying thereto a concentrated, phenol-aldehyde resin solution containing at least about 68–72% phenol-aldehyde resin solids and having a viscosity within the range of from about 100–250 centipoises at 75° F., the remainder of said solution being substantially volatilizable and substantially one half of the remainder constituting moisture, the moisture content of the dried sheet and the amount of such resin solution which is applied to the sheet being so limited that the quantity $m$ in the following formula does not exceed 8–10%:

$$m = \frac{\left(m_s + \frac{r_v}{2}\right)}{s+r} \cdot 100\%$$

where $s$ equals the total weight of a unit area of the dried, unimpregnated base sheet; $m_s$ equals the total weight of the moisture in said unit area of the dried sheet prior to impregnation; $r$ is the total weight of the resin impregnating solution applied to said unit area of the dried sheet; and $r_v$ equals the total weight of the volatile content of the resin applied to said unit area of the sheet.

3. In the manufacture of resin impregnated, cellulosic sheet products by the use of water-soluble phenolic resins, the improvement which consists in drying the sheet to be impregnated, and then impregnating the dried sheet by applying thereto a concentrated water-soluble, phenol-aldehyde resin solution containing at least about 68–72% of phenol-aldehyde resin solids, the remainder being substantially volatilizable and substantially one half of said remainder constituting moisture, the moisture content of the dried sheet and the amount of such resin solution which is applied to the sheet being so limited that the quantity $m$ in the following formula, which quantity is representative of the total moisture available to wet the cellulosic fibers of the sheet at the time of impregnation, does not exceed 4–6%:

$$m = \frac{\left(m_s + \frac{r_v}{2}\right)}{s+r} \cdot 100\%$$

where $s$ equals the total weight of a unit area of the dried, unimpregnated base sheet; $m_s$ equals the total weight of the moisture in said unit area of the dried sheet prior to impregnation; $r$ is the total weight of the resin impregnating solution applied to said unit area of the dried sheet; and $r_v$ equals the total weight of the volatile content of the resin applied to said unit area of the sheet.

4. The method of manufacturing an improved, resin-impregnated, cellulosic sheet product from a base sheet containing at least a large percentage of chemical pulp, which consists in drying the sheet to be impregnated, and then impregnating the dried sheet by applying thereto a concentrated water soluble phenol-aldehyde resin solution containing at least about 68–72% phenol-aldehyde resin solids and having a viscosity within the range of from about 100–250 centipoises at 75° F., the remainder of said solution being substantially volatilizable and substantially one half of said remainder constituting moisture, the moisture content of the dried sheet and the amount of such resin solution which is applied to the sheet being so limited that the quantity $m$ in the following formula does not exceed 4–6%:

$$m = \frac{\left(m_s + \frac{r_v}{2}\right)}{s+r} \cdot 100\%$$

where $s$ equals the total weight of a unit area of the dried, unimpregnated base sheet; $m_s$ equals the total weight of the moisture in said unit area of the dried sheet prior to impregnation; $r$ is the total weight of the resin impregnating solution applied to said unit area of the dried sheet; and $r_v$ equals the total weight of the volatile content of the resin applied to said unit area of the sheet.

DONALD H. GRANGAARD.

References Cited in the file of this patent

UNITED STATES PATENTS

| Number | Name | Date |
|---|---|---|
| 2,054,444 | Pinten | Sept. 15, 1936 |
| 2,185,477 | Thompson et al. | Jan. 2, 1940 |
| 2,190,672 | Meharg | Feb. 20, 1940 |